United States Patent [19]
Clarey et al.

[11] Patent Number: 5,206,777
[45] Date of Patent: Apr. 27, 1993

[54] THREE-PHASE PANELBOARD USING STANDARD RATED THREE-POLE CIRCUIT PROTECTIVE DEVICES IN A GROUNDED DELTA SYSTEM

[75] Inventors: Robert J. Clarey, Brookfield; Richard A. Reiner, Colgate, both of Wis.

[73] Assignee: Eaton Corporation, Cleveland, Ohio

[21] Appl. No.: 764,255

[22] Filed: Sep. 23, 1991

[51] Int. Cl.⁵ ................................................ H02H 3/00
[52] U.S. Cl. ...................................... 361/63; 361/46; 361/103
[58] Field of Search ............... 361/62, 63, 102, 355, 361/426, 356, 46; 439/94, 95, 796, 797, 798, 810, 814

[56] References Cited

U.S. PATENT DOCUMENTS

| | | | |
|---|---|---|---|
| 2,905,923 | 2/1955 | Hammerly | 439/798 |
| 3,611,048 | 10/1971 | Shelvik | 317/119 |
| 3,745,415 | 7/1973 | Polley et al. | 361/46 |
| 3,769,549 | 10/1973 | Bangert, Jr. | 361/46 |
| 3,818,282 | 6/1974 | Buxton et al. | 439/721 |
| 3,869,649 | 3/1975 | Hobson, Jr. | 361/93 |
| 5,070,429 | 12/1991 | Skirpan | 361/356 |

OTHER PUBLICATIONS

Distribution Systems—Grounded or Ungrounded?, Electrical Construction and Maintenance, Apr. 1979, pp. 67–71.

Primary Examiner—Jeffrey A. Gaffin
Attorney, Agent, or Firm—L. G. Vande Zande

[57] ABSTRACT

A neutral connector of a standard three-phase, three-wire panelboard is replaced by a specific multiple termination assembly having a limited number of terminations specifically adapted for connection to ground at the panelboard, for grounding the termination assembly to the panelboard enclosure, and for connecting the multiple termination assembly to the power conductor of the system grounded phase which is also connected to one pole of the main circuit breaker, main switch or main lug of the panelboard. Standard AIC rated three-pole circuit breakers or fusible switches are wired to three-phase loads in the branch circuits and connected to the three bus bars of the panelboard to connect the grounded phase to the load through the circuit breaker or switch, and to open all phases when operated.

17 Claims, 3 Drawing Sheets

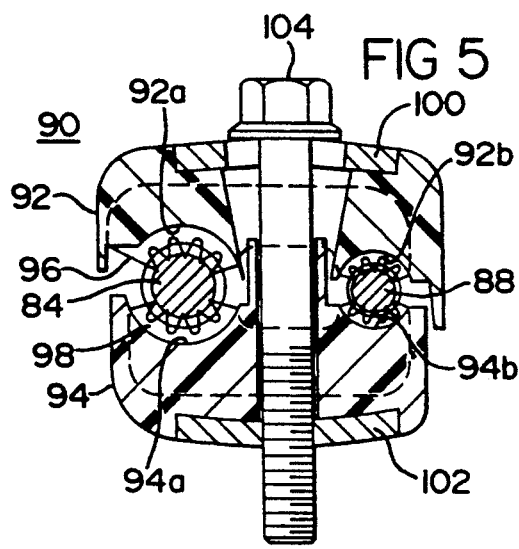
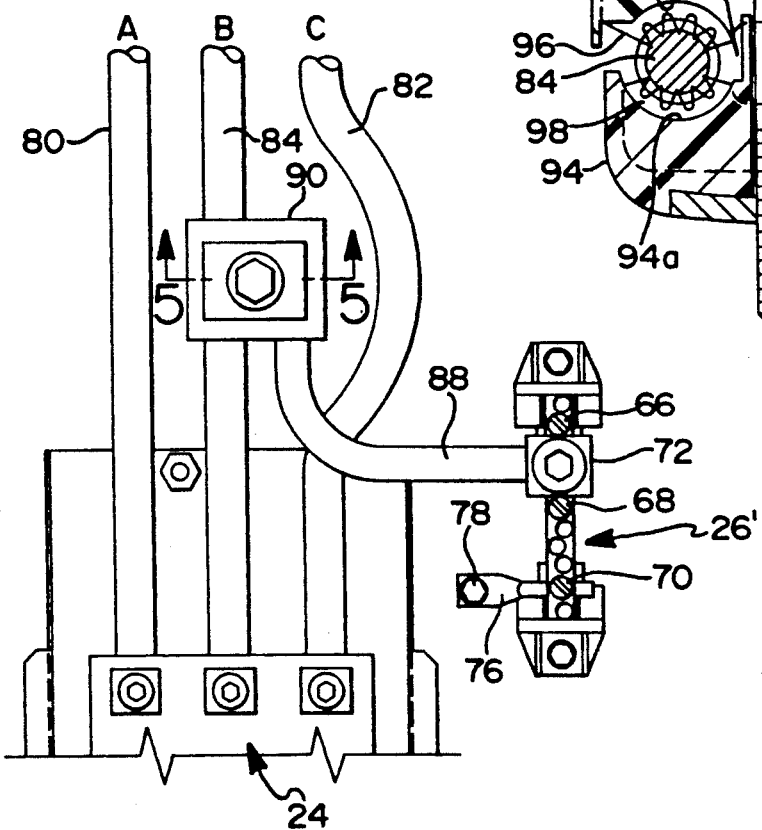
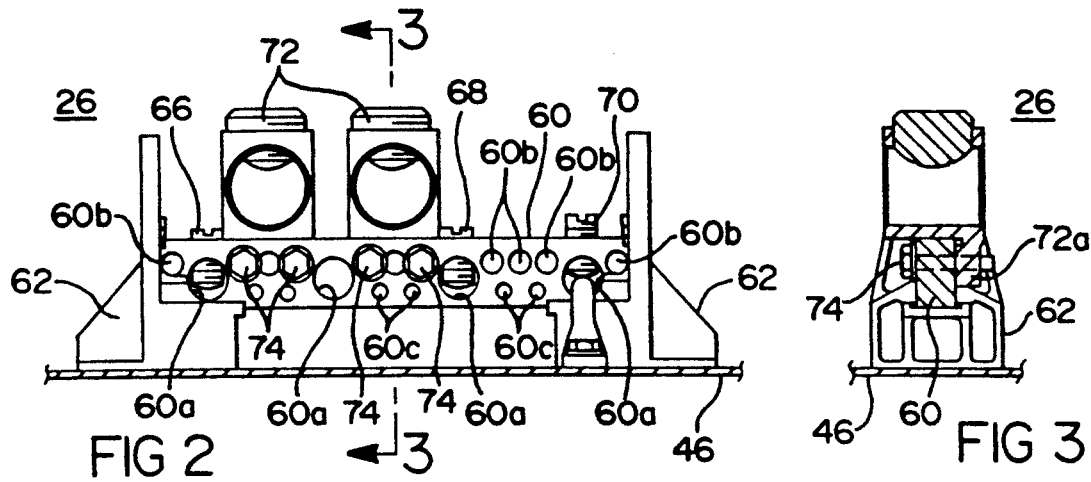

THREE-PHASE PANELBOARD USING STANDARD RATED THREE-POLE CIRCUIT PROTECTIVE DEVICES IN A GROUNDED DELTA SYSTEM

BACKGROUND OF THE INVENTION

This invention relates to electrical distribution panelboards and associated circuit protective apparatus for use in a grounded delta system. The panelboards may have main circuit breakers, main lug devices or main disconnect switch apparatus associated therewith.

Electric utility companies have for some time offered grounded delta distribution systems in certain geographical markets. The grounded delta system is a three phase, three-wire system wherein one phase of the delta configured transformer is grounded. Presently, grounded delta systems require specially rated, tested and labeled circuit protective apparatus such as circuit breakers, lugs and switches for both main and branch circuit applications. These are usually two-pole devices, but may be three-pole devices wherein only two poles are operably connected to the ungrounded phases of the delta power supply. The grounded phase of the delta power supply is connected to a neutral connector within the panelboard, and subsequently is connected from the neutral directly to the load in the respective branch circuits, bypassing the protective apparatus. Since only two phases are being opened by the protective apparatus, two poles of the apparatus handle the current and voltage that a three-pole apparatus would normally handle. The short circuit current interrupting capacity (AIC) rating of protective apparatus specifically labeled for grounded delta phase application is usually low, often much lower than such rating for the same apparatus used in a customary three-phase application. The need to manufacture and stock specially tested and labeled devices is burdensome to manufacturer, distributor and electrical contractor alike. Moreover, while two and three-pole breakers are intended to be used in a grounded delta phase panelboard, it is possible that a single pole breaker may be erroneously connected to one phase of the panel and into an available space in the conventional neutral connector, thereby inadvertently applying full transformer voltage to, for example, an outlet.

SUMMARY OF THE INVENTION

This invention eliminates need for specially rated, tested and labeled circuit protective apparatus for grounded delta applications. The invention provides a conventional three-phase, three-wire panelboard with a specific multiple termination assembly which is substituted for the conventional neutral connector provided with the panelboard, the multiple termination assembly having a predetermined finite number and size of connector provisions. The multiple termination assembly is grounded to the panelboard enclosure and to a water pipe and/or a ground rod as required by local codes. The grounded phase of a grounded delta system is grounded at the power supply and is connected to the multiple termination assembly and to the appropriate pole of a three-pole main connection apparatus of the panelboard such as a circuit breaker. Thus one phase of the panelboard is connected to ground and, by using three-pole main and branch circuit breakers or fused switches, loads in the branch circuits may be wired to the protective apparatus as in an ungrounded system, although one phase will be grounded through the circuit protective apparatus.

This invention, its features and advantages, will become more readily apparent when reading the following description and claims in conjunction with the accompanying drawings.

BRIEF DESCRIPTION OF THE DRAWINGS

FIG. 2 is a side elevation view of a multiple termination assembly of this invention taken in the direction of the line 2—2 in FIG. 1;

FIG. 3 is a cross sectional view of the multiple termination assembly taken along the line 3—3 in FIG. 2;

FIG. 4 is a partial view of panelboard components arranged in an alternative embodiment;

FIG. 5 is a cross sectional view of one component taken along the line 5—5 in FIG. 4;

DETAILED DESCRIPTION OF THE PREFERRED EMBODIMENT

Figure 6:
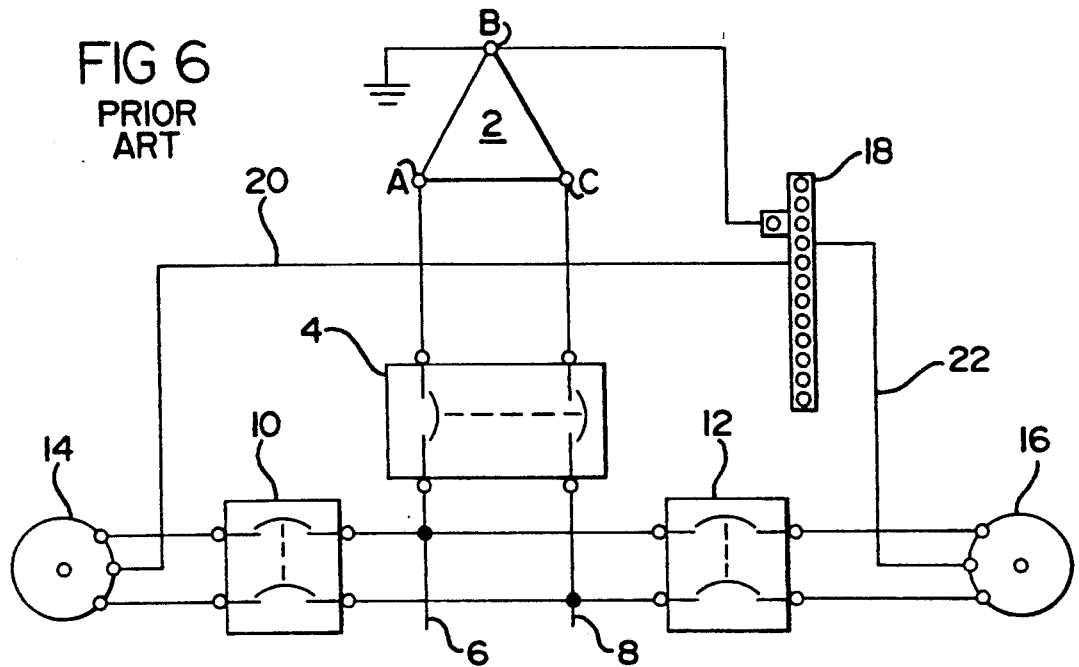
FIG. 6 is a schematic view of a grounded delta system with main and branch circuit protective apparatus of a panelboard wired to branch circuit three-phase load devices according to present practices.

Referring specifically to FIG. 6 of the drawings, a grounded delta electrical power distribution system is shown wired according to present day practices. A three-phase delta configured power supply 2, such as a transformer, has one phase B grounded. The other two phases A and C of power supply 2 are connected to a main connection device 4 of an electrical distribution panelboard. The main connection device 4 comprises manually switchable apparatus such as a current responsive circuit breaker, a fusible switch, or may be a lug main assembly if an overcurrent responsive circuit breaker or fused switch is used in the system ahead of the particular panelboard. The main connection device 4 may be a two or three-pole device, however only two poles are utilized and therefore only two are shown. The load side of the main connection apparatus is connected to bus bars 6 and 8 of the panelboard, which also may be a three-phase, three bus bar device, but only two phases are utilized and therefore only two are shown. Branch circuit protective devices 10 and 12 are attached by appropriate connectors to the bus bars 6 and 8 to supply power to branch circuit apparatus such as three-phase loads 14 and 16. The branch circuit protective devices may be overcurrent responsive circuit breakers or fusible switch apparatus and again may be two or three-pole devices, although only two poles are utilized. The grounded phase B of power supply 2 is connected to a conventional neutral connector 18 furnished with the panelboard. Individual wire conductors 20 and 22 are connected to the neutral 18 and to respective branch circuit loads 14 and 16, bypassing the main connection device 4 and the branch circuit protective devices 10 and 12, respectively In this system, if a short occurs in the branch circuit between phases A and C, both poles of the apparatus 10 or 12 share in the interruption of the short circuit current, although the two poles are interrupting short circuit current that would normally be interrupted by three poles in another type of electrical distribution system. Accordingly, the devices 10 and 12 used in the grounded delta system cannot interrupt as high of short circuit current as would the same device when used in an application where all three phases were actively interrupted. Therefore, the AIC rating of the devices 10 and 12 is lower than the apparatus is conventionally rated and the devices must be specially labeled with the lower rating. This requires extra handling and extra part numbers for the manufacturer of the distribution apparatus and requires the distributor to maintain additional stock. An even greater problem exists when the short in the branch circuit exists between the grounded B phase and an ungrounded phase A or C wherein only one contact or pole of the circuit protective device 10 or 12 is required to interrupt the full short circuit current.

Figure 7:
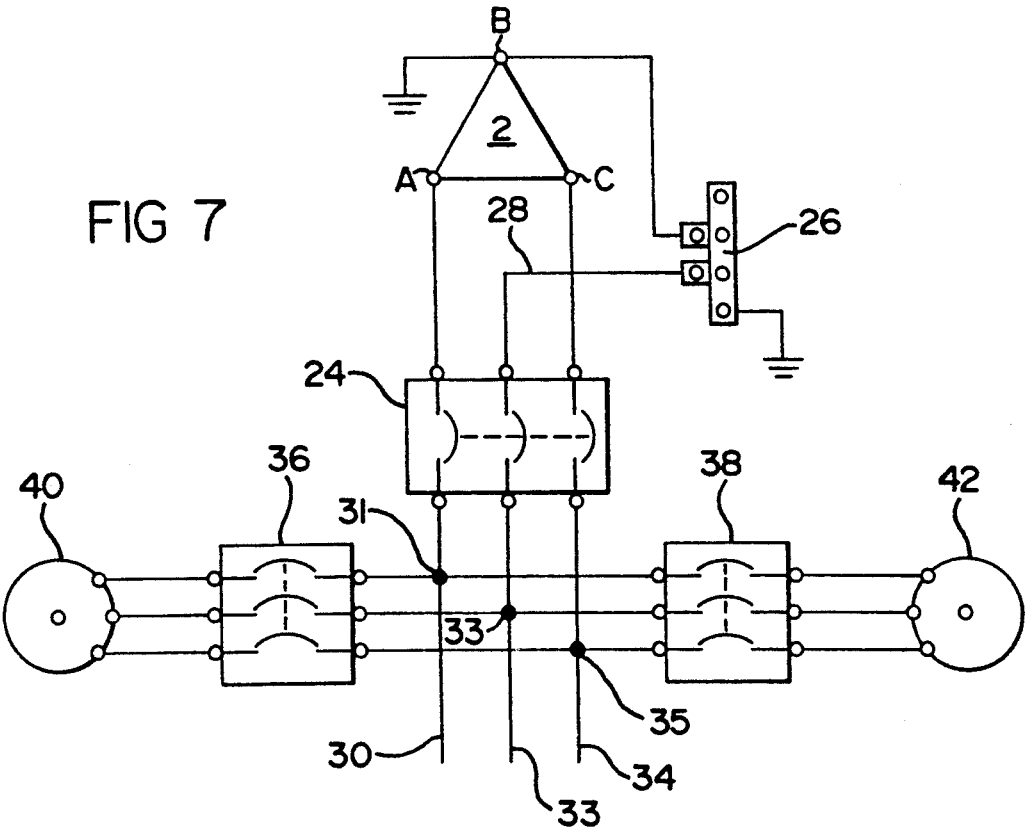
FIG. 7 is a schematic view of a grounded delta system with main and branch circuit protective apparatus of a panelboard wired to branch circuit three-phase load devices according to this invention.

FIG. 7 shows a grounded delta system and panelboard apparatus constructed and wired in accordance with this invention. The grounded delta power supply 2 has its ungrounded phases A and C connected to two poles of a three-pole main connection device 24 The grounded phase of the supply is connected to a special multiple termination connector assembly 26 which replaces the neutral 18 of the panelboard of FIG. 6. A jumper conductor 28 is connected from the multiple terminal assembly 26 to the remaining pole of the three-pole main connection device 24. Thus the grounded B phase of the system is connected to one pole of the three-pole main connection device of a three-phase panelboard having bus bars 30, 32 and 34 attached to the load side terminals of the respective poles of the main connection device 24. Three-pole branch circuit protective devices 36 and 38 are connected to the bus bars 30, 32 and 34. Branch circuit load devices 40 and 42 are hard wire connected to the load side of the protective devices 36 and 38, respectively, to supply power to the load devices 40 and 42. Branch circuit protective devices 36 and 38 may be three-pole overcurrent responsive circuit breakers or three-pole fusible switches and are attached to the bus bars 30, 32 and 34 and wired to the load devices 40 and 42 in a conventional three-phase manner. Thus the grounded B phase of the grounded delta system is connected to the load devices 40 and 42 through one pole of three-pole devices used both as main and branch circuit protective apparatus. The devices operate to interrupt all three phases of the system and share the interruption capability. Accordingly, the AIC capability of the devices is the same as if the device were used in a normal three-phase manner. Accordingly, the panelboard of this invention as represented in FIG. 7 used in a grounded delta system permits use of standard rated and labeled circuit protective apparatus without a need for derating and specially labeling the device for a lower AIC. Moreover, any series rating already established for a three-phase, three-wire system can be used in an established manner in this panelboard.

Figure 1:
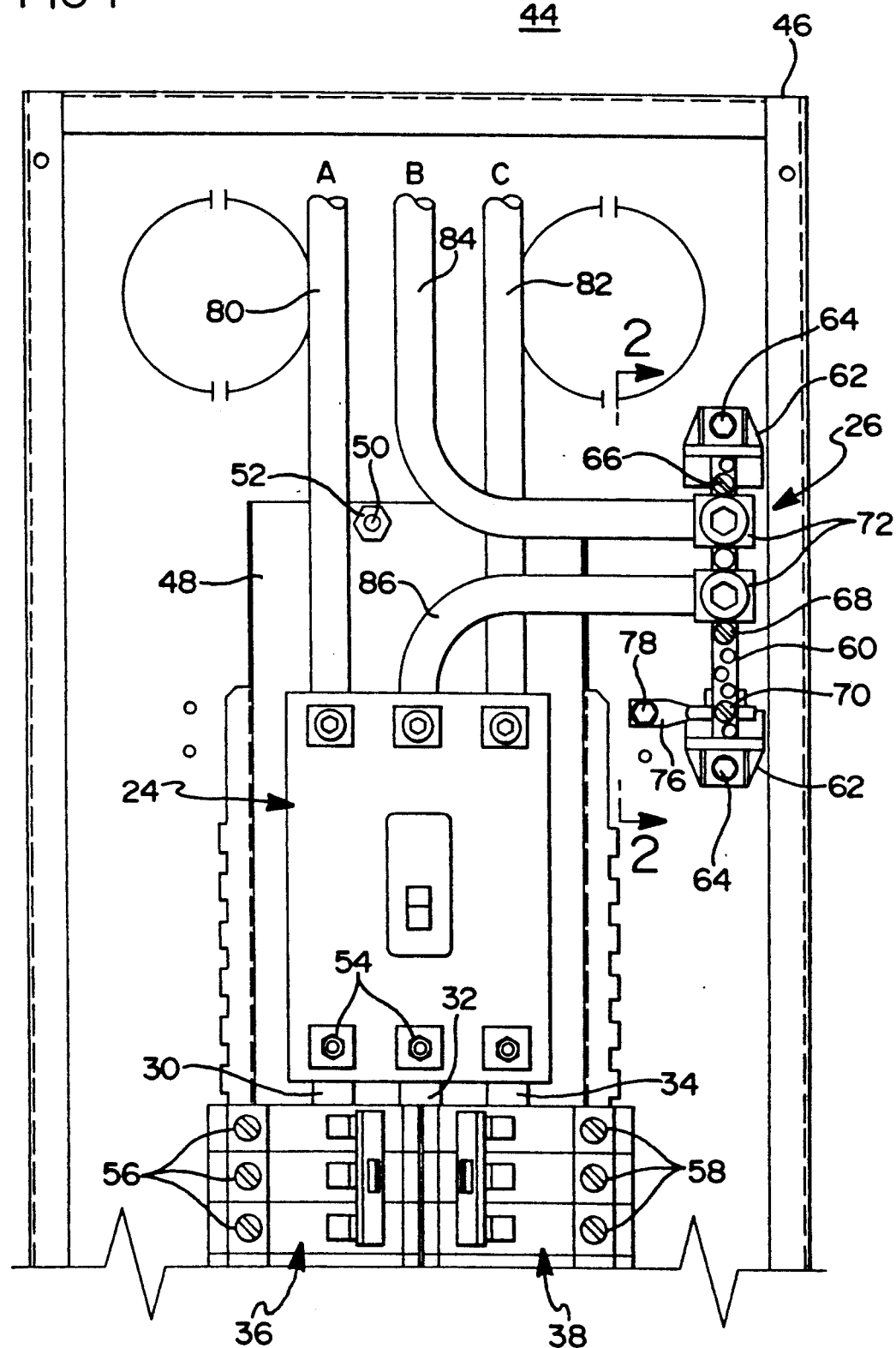
FIG. 1 is a front plan view of an electrical distribution panelboard constructed in accordance with this invention.

Referring to FIG. 1, a panelboard 44 constructed in accordance with this invention comprises a metal enclosing case 46 in which is mounted a three-phase, three-wire panel 48 by posts 50 projecting forwardly from a rear wall of the enclosure 46, extending through an opening in the panel 48 and being secured thereto by nuts 52 which threadably engage the posts 50. The length of the panelboard 44 and particularly the panel 48 is a predetermined variable and therefore the bottom of the panelboard assembly 44 has not been shown in FIG. 1 and therefore only one post 50 and nut 52 have been shown in FIG. 1. The panel 48 may be a three-phase, three-wire panel such as that shown in U.S. Pat. No. 3,611,048 issued to B. S. Shelvik, Oct. 5, 1971, the disclosure of which is incorporated herein by reference. The bus bars 30, 32 and 34 are mounted to panel 48 by a system of insulator members not shown in FIG. 1. The main connection device 24 of the panel 48 is illustrated as a three-pole molded case overcurrent responsive circuit breaker having three load side terminals attached to the bus bars 30, 32 and 34 by nuts 54 which threadably engage with upstanding threaded posts of the respective bus bars extending through holes in the terminals of the circuit breaker. The branch circuit protective devices 36 and 38 are illustrated in FIG. 1 as being three-pole overcurrent responsive circuit breakers which attach to suitable branch circuit connectors, represented by modes 31, 33, 35 in FIG. 7, on the bus bars 30, 32 and 34 to connect each pole of the respective circuit breaker to a respective phase of the panelboard. Each pole of the respective circuit breakers has a screw terminal 56, 58, respectively, for attaching wire conductors from the respective branch circuits to the circuit breakers. The wire conductors are not shown in FIG. 1, but extend from the terminals 56, 58, respectively, to the loads such as 40, 42, respectively shown in FIG. 7.

Panelboard 44 is conventionally provided with a neutral connector assembly (not shown) which comprises an aluminum or similar conductive bar having a plurality of holes therein with intersecting threaded holes having set screws for clamping conductor wires within the first-mentioned holes of the bar. The conventional neutral is provided with a number of holes corresponding to the single pole branch circuit capacity of the particular panel 48 of the panelboard 44. The neutral is also provided with at least three additional holes for connection with grounding wires or a grounding strap as will be discussed hereinafter. To provide the panelboard of this invention, the conventional neutral connector is removed and discarded, either at the factory or by the electrician installing the panel in the field. A special multiple termination assembly 26 is installed to the back wall of enclosing case 46 in the place of the original neutral connector. The multiple termination assembly 26 can take on numerous forms and it is to be recognized that the connector assembly 26 disclosed herein represents the presently contemplated best mode. Of most importance to this invention, however, is that multiple termination assembly has a finite number of operative terminals as described hereinbelow to prevent inadvertent connection of single pole circuit breakers to the panelboard. Referring also to FIGS. 2 and 3, the multiple termination assembly 26 comprises a multi-apertured conductive bar 60 supported between a pair of insulating support members 62 which are affixed to the rear wall of enclosing case 46 by a pair of screws 64. Bar 60 is provided with reoccurring patterns of holes formed through the bar at the sides thereof, respective ones of which are intersected by tapped holes provided in the forward (as oriented in the panelboard) surface of bar 60. The pattern comprises a large hole 60a with three intermediate sized holes 60b aligned at one side thereof and a pair of smaller holes 60c aligned to the side of hole 60a and rearward of holes 60b. Holes 60a are provided with tapped holes in the forward surface of the bar 60 to receive set screws 66, 68 and 70 therein. Holes 60b also have tapped holes intersecting therewith, but the holes are not provided with screw terminals. A pair of hexagonal set screw wire lug connectors 72 have a depending offset tang 72a (FIG. 3) which extends along one side of the bar 60. Tang 72a has a pair of threaded holes that align with outer holes of the set of three intermediate sized holes 60b. Lug terminals 72 are attached to bar 60 by pairs of screws 74 which extend through appropriate holes 60b and threadably engage in the holes in tang 72a. Support members 62 are electrically insulating and therefore insulate the multiple termination assembly from the enclosing case. However, when such equipment is used as service entrance equipment it is required to ground the multiple termination assembly 26 to the enclosing case 46. This is accomplished in a conventional manner by a bonding strap 76 which is inserted through one of the holes 60a in bar 60 and bolted to the rear wall of enclosing case 46 by a screw 78. Set screw 70 is turned town tight upon the bonding strap 76 to firmly clamp the strap within the hole 60a and make good electrical connection therewith. Holes 60a associated with set screws 66 and 68 are provided to receive the grounding conductor wire leading to a water pipe ground or to a driven rod ground. In some instances both types of grounds are utilized.

To connect the panelboard 44 to the grounded delta system, power conductor wires 80 and 82 of the A and C phase of the power supply 2 are connected to the supply side terminals of the outer two poles of the three-pole main circuit breaker. Power conductor wire 84 from the grounded B phase of the power supply 2 is connected to one of the lug wire terminals 72 and clamped firmly therein by the associated set screw. Thus the multiple termination assembly 26 is electrically connected to the grounded B phase of the supply. A jumper conductor wire 86 of equivalent size to that of wire 84 is connected between the remaining wire lug connector 72 of the multiple termination assembly 26 and the supply side terminal of the center pole of the main circuit breaker, thereby connecting the center pole of the circuit breaker to the grounded B phase of the supply 2. When the main circuit breaker is closed the center phase bus bar 32 is connected through the circuit breaker to the grounded B phase of the power supply 2. Similarly, the center poles of each of the branch circuit protective three-pole breakers 36 and 38 are connected to the grounded B phase of the supply 2 when those breakers are operated to their on condition and therefore the load devices in the respective branch circuits connected to these breakers are also connected to the grounded B phase.

An alternative connection arrangement for the panelboard is shown in FIGS. 4 and 5. In this embodiment, the multiple termination connector 26' is modified by shortening the bar 60 by one pattern of holes 60a, 60b, 60c to have only one wire lug connector 72 mounted thereon. The set screws 66, 68 and 70 are provided for effecting the grounding connections as described in conjunction with the panelboard shown in FIG. 1. In this embodiment, the B phase power conductor wire 84 is connected directly to the center pole line side terminal of the main circuit breaker 24 similarly to the power conductor wires 80 and 82 of the A and C phases which are connected to the outer poles of the main circuit breaker A splice connector assembly 90 is attached to the center wire 84 and to a jumper wire 88 which is connected to the connector 72 of assembly 26'. As best seen in FIG. 5, the splice connector assembly 90 comprises upper and lower insulated moldings 92 and 94, each of which have pairs of toothed splice plates 96 and 98, respectively, disposed within semi-cylindrical openings 92a, 92b and 94a, 94b, respectively. A washer plate 100 is positioned within a hole at the upper surface of molding 92 and a threaded plate 102 is positioned within an opening recess at the bottom surface of molding 94. A bolt 104 extends through the washer plate 100 and appropriate openings within the moldings 92 and 94 to threadably take into the threaded plate 102 to draw the molding members 92 and 94 together upon tightening of the screw. In so doing, the teeth of the splice plates 96 and 98 puncture or pierce the insulating covering of the conductor wires 84 and 88 and electrically interconnect the two conductor wires In this manner, grounded B phase conductor 84 is also grounded to the panelboard 44 and to a local ground through the connector assembly 26' at the power supply side of the main circuit breaker 24.

The panelboard constructed and wired according to either of the aforedescribed embodiments has one phase connected to the ground phase of the power supply. That phase is also connected to ground at the panelboard, ahead of the main connection device Standard rated three-phase three-pole devices such as a main circuit breaker, a main fusible switch or a main lug connector are used to connect the panelboard bus bars to the power supply. Standard three-pole branch circuit protective devices such as circuit breakers or fusible switches are connected to the panelboard and bus bars in a conventional manner. Three-phase load devices in the respective branch circuits are wired to the three poles of the branch circuit protective devices, also in a conventional manner. This arrangement permits all three phases of the system to be broken by conventional circuit making and breaking apparatus, taking advantage of the AIC rating of such apparatus, while maintaining the grounded phase connection to the branch circuit load devices when the apparatus is closed. While the panelboard of this invention has been disclosed herein in preferred, best-mode embodiments, it is be understood that it is susceptible of various modifications without departing from the scope of the appended claims.

We claim:

1. A three-phase, three-wire panelboard for use in a grounded delta electrical distribution system wherein one phase of a delta configured electric power supply is grounded, said panelboard comprising three electrically conductive bus members having branch circuit connector means for electrical connection of branch circuit protective apparatus to said bus members;

main connection means electrically connected to said bus members and connectable to power conductors for connecting said bus members to respective phases of said grounded delta power supply;

grounding means connecting said power conductor of said grounded phase to ground at a power supply side of said main connection means; and three-pole circuit protective apparatus connected to said branch circuit connector means of respective said bus members for supplying a three-phase load in a branch circuit, respective phases of said three-phase load being individually connectable to each pole of said three-pole circuit protective apparatus.

2. The three-phase, three-wire panelboard defined in claim 1 wherein said grounding means comprises an electrically common multiple termination assembly comprising first terminal means for connecting said power conductor of said grounded phase to said multiple termination assembly, and second terminal means for connecting a grounded electrode to said multiple termination assembly.

3. The three-phase, three-wire panelboard defined in claim 2 wherein said second terminal means comprises a pair of wiring terminals individually connectable to a conductor connected to a water pipe and to a conductor connected to a ground rod, respectively.

4. The three-phase, three-wire panelboard defined in claim 3 comprising a metal case, said multiple termination assembly being bonded to said case for electrical grounding thereto.

5. The three-phase, three-wire panelboard defined in claim 4 wherein said multiple termination assembly comprises a third wiring terminal and is bonded to said case by a conductor fastened to said case and connected to said third wiring terminal.

6. The three-phase, three-wire panelboard defined in claim 5 wherein said main connection means comprises manually switchable apparatus.

7. The three-phase, three-wire panelboard defined in claim 6 wherein said switchable apparatus comprises an overcurrent responsive circuit breaker.

8. The three-phase, three-wire panelboard defined in claim 2 wherein:
said main connection means comprises wiring terminals corresponding to each phase of said power supply;
said first terminal means of said multiple termination assembly comprises a pair of wiring terminals, one of said pair of wiring terminals being connectable to said power conductor of said grounded phase; and
further comprising a jumper conductor connected to the other of said pair of wiring terminals and to one of said wiring terminals of said main connection means.

9. The three-phase, three-wire panelboard defined in claim 2 wherein:
said main connection means comprises wiring terminals corresponding to each phase of said power supply connectable with said power conductors; and
said grounding means comprises a jumper conductor connected to said first terminal means of said multiple termination assembly and a splice connector connecting said jumper to said power conductor of said grounded phase.

10. A standard rated three-phase, three-wire panelboard for use in a grounded delta electrical distribution system wherein one phase of a delta configured electric power supply is grounded, said panelboard comprising:
standard three-phase rated, three-pole main connection apparatus, each pole having a supply side wiring terminal adapted to receive a power supply conductor and a load side terminal;
three bus members connected to said load side terminal of respective poles of said main connection apparatus;
standard three-phase rated three-pole branch circuit protective devices connected to said bus members, individual poles of said devices connectable to a respective phase of a three-phase load in a respective branch circuit;
a multiple termination assembly comprising first terminal means adapted to receive a power supply conductor of said grounded phase, second terminal means adapted to receive a jumper power supply conductor, third terminal means adapted to receive a ground conductor from a water pipe ground, fourth terminal means adapted to receive a ground conductor from a driven rod ground, and fifth terminal means adapted to receive a bonding strap; and
a jumper power supply conductor connected between said second terminal means and a said supply side wiring terminal of one pole of said main connection apparatus.

11. The standard rated three-phase, three-wire panelboard defined in claim 10 further comprising a metal case and a bonding strap connected to said metal case and to said fifth terminal means.

12. The standard rated three-phase, three-wire panelboard define in claim 10 wherein said main connection apparatus comprises manually operable switching apparatus having overcurrent protection means.

13. The standard rated three-phase, three-wire panelboard defined in claim 10 wherein said main connection apparatus comprises an overcurrent responsive circuit breaker.

14. A standard rated three-phase, three-wire panelboard for use in a grounded delta electrical distribution system wherein one phase of a delta configured electric power supply is grounded, said panelboard comprising:
standard three-phase rated, three-pole main connection apparatus, each pole having a supply side wiring terminal adapted to receive a power supply conductor and a load side terminal;
three bus members connected to said load side terminal of respective poles of said main connection apparatus;
standard three-phase rated three-pole branch circuit protective devices connected to said bus members, individual poles of said devices connectable to a respective phase of a three-phase load in a respective branch circuit;
a multiple termination assembly comprising first terminal means adapted to receive a jumper power supply conductor, second terminal means adapted to receive a ground conductor from a water pipe ground, third terminal means adapted to receive a ground conductor from a driven rod ground, and fourth terminal means adapted to receive a bonding strap;
a power conductor connectable to said grounded phase of said power supply and connected to a said supply side wiring terminal of one pole of said main connection apparatus;
a jumper power conductor connected to said first terminal means; and
a splice connector connecting said jumper power conductor and said power conductor of said grounded phase of said power supply together.

15. The standard rated three-phase, three-wire panelboard defined in claim 14 further comprising a metal case and a bonding strap connected to said metal case and to said fifth terminal means.

16. The standard rated three-phase, three-wire panelboard defined in claim 14 wherein said main connection apparatus comprises manually operable switching apparatus having overcurrent protection means.

17. The standard rated three-phase, three-wire panelboard defined in claim 14 wherein said main connection apparatus comprises an overcurrent responsive circuit breaker.

* * * * *